United States Patent
Zhang et al.

(10) Patent No.: US 10,162,078 B2
(45) Date of Patent: Dec. 25, 2018

(54) IN-WELL MONITORING OF COMPONENTS OF DOWNHOLE TOOLS

(71) Applicants: Qiong Zhang, Spring, TX (US); Yi Liu, Houston, TX (US); Thomas M. Scott, Cypress, TX (US)

(72) Inventors: Qiong Zhang, Spring, TX (US); Yi Liu, Houston, TX (US); Thomas M. Scott, Cypress, TX (US)

(73) Assignee: BAKER HUGHES, Houston, TX (US)

( * ) Notice: Subject to any disclaimer, the term of this patent is extended or adjusted under 35 U.S.C. 154(b) by 0 days.

(21) Appl. No.: 15/404,237

(22) Filed: Jan. 12, 2017

(65) Prior Publication Data

US 2018/0196159 A1    Jul. 12, 2018

(51) Int. Cl.
*G01V 5/10* (2006.01)

(52) U.S. Cl.
CPC .................................... *G01V 5/107* (2013.01)

(58) Field of Classification Search
CPC ............................... E21B 47/011; E21B 47/01
See application file for complete search history.

(56) References Cited

U.S. PATENT DOCUMENTS

| | | | |
|---|---|---|---|
| 5,149,984 A | 9/1992 | Schultz et al. | |
| 5,706,892 A | 1/1998 | Aeschbacher et al. | |
| 5,730,219 A | 3/1998 | Tubel et al. | |
| 5,959,547 A | 9/1999 | Tubel et al. | |
| 6,046,685 A | 4/2000 | Tubel | |
| 6,167,965 B1 | 1/2001 | Bearden et al. | |
| 6,192,980 B1 | 2/2001 | Tubel et al. | |
| 6,873,267 B1 | 3/2005 | Tubel et al. | |
| 7,705,295 B2 | 4/2010 | Jeffryes | |
| 8,129,673 B2 | 3/2012 | Vaeth et al. | |

(Continued)

FOREIGN PATENT DOCUMENTS

| | | |
|---|---|---|
| FR | 2242692 | 3/1975 |
| GB | 2305196 | 4/1997 |

(Continued)

OTHER PUBLICATIONS

Liang, et al. "Downhole Monitoring Tool Design Using Power Line Disturbances", Industrial & Commercial Power Systems Technical Conference (I&CPS), May 5-8, 2015, IEEE/IAS 51st; 11 pages.

(Continued)

*Primary Examiner* — Kenneth J Malkowski
(74) *Attorney, Agent, or Firm* — Cantor Colburn LLP

(57) ABSTRACT

Systems and methods for downhole component monitoring including a monitored component doped with a pre-selected neutron absorbent, the monitored component being part of a downhole tool and a neutron monitoring system positioned relative to the monitored component. The neutron monitoring system includes a neutron source positioned at a first location relative to the monitored component and a neutron detector positioned at a second location relative to the monitored component, the neutron detector configured to detect neutrons from the neutron source and count said detected neutrons. A control unit is in communication with the neutron detector and configured to determine a status of the monitored component from the neutron count received from the neutron detector.

16 Claims, 5 Drawing Sheets

(56) References Cited

U.S. PATENT DOCUMENTS

| | | |
|---|---|---|
| 8,169,337 B2 | 5/2012 | Evans |
| 8,931,549 B2 | 1/2015 | Smith |
| 2004/0178337 A1 | 9/2004 | Kurkoski et al. |
| 2009/0242746 A1* | 10/2009 | Pemper ............... G01V 5/101 250/269.6 |
| 2010/0332138 A1 | 12/2010 | Inanc et al. |
| 2011/0024613 A1* | 2/2011 | Roberts ............... G01N 23/09 250/256 |
| 2012/0010819 A1 | 1/2012 | Ansari et al. |
| 2012/0080588 A1 | 4/2012 | Smith et al. |
| 2013/0008646 A1 | 1/2013 | Blount |
| 2013/0020075 A1 | 1/2013 | Chace et al. |
| 2014/0343857 A1 | 11/2014 | Pfutzner et al. |
| 2014/0367562 A1 | 12/2014 | Vasilyev et al. |
| 2015/0108339 A1* | 4/2015 | Guo ............... G01V 5/101 250/269.6 |
| 2016/0003025 A1 | 1/2016 | Beekman et al. |
| 2016/0320521 A1* | 11/2016 | Mauborgne ............ G01V 5/101 |

FOREIGN PATENT DOCUMENTS

| | | |
|---|---|---|
| GB | 2309471 | 7/1997 |
| GB | 2317406 | 3/1998 |
| WO | 2013096267 A1 | 6/2013 |

OTHER PUBLICATIONS

Pemper, et al. "The Direct Measurement of Carbon in Wells Containing Oil and Natural Gas Using a Pulsed Neutron Mineralogy Tool", SPE Annual Technical Conference and Exhibition, Oct. 4-7, New Orleans, Louisiana, 2009; 14 pages.

Yu, et al. "Accuracy and borehole influences in pulsed neutron gamma density logging while drilling", Applied Radiation and Isotopes, vol. 69 (2011) 1313-1317.

International Search Report, International Application No. PCT/US2017/065227, dated Mar. 27, 2018, Korean Intellectual Property Office; International Search Report 4 pages.

International Written Opinion, International Application No. PCT/US2017/065227, dated Mar. 27, 2018, Korean Intellectual Property Office; Written Opinion 9 pages.

* cited by examiner

IN-WELL MONITORING OF COMPONENTS OF DOWNHOLE TOOLS

BACKGROUND

1. Field of the Invention

The present invention generally relates to downhole tools and more particularly to monitoring of downhole components and methods and apparatuses for monitoring downhole components.

2. Description of the Related Art

Boreholes are drilled deep into the earth for many applications such as carbon dioxide sequestration, geothermal production, and hydrocarbon exploration and production. In all of the applications, the boreholes are drilled such that they pass through or allow access to a material (e.g., a gas or fluid) contained in a formation located below the earth's surface. Different types of tools and instruments may be disposed in the boreholes to perform various tasks and measurements.

Downhole tools and components are subject to various environmental conditions, operational conditions, and other events. As such, the downhole components may be subject to wear, fatigue, damage, etc. Accordingly, it may be advantageous to have monitoring systems and processes to monitor the health of the downhole components.

SUMMARY

Disclosed herein are systems and methods for downhole component monitoring. The systems and methods include a monitored component doped with a pre-selected neutron absorbent, the monitored component being part of a downhole tool. A neutron monitoring system is positioned relative to the monitored component, the neutron monitoring system having a neutron source positioned at a first location relative to the monitored component and a neutron detector positioned at a second location relative to the monitored component. The neutron detector is configured to detect neutrons from the neutron source and count said detected neutrons. A control unit is in communication with the neutron detector and configured to determine a status of the monitored component from the neutron count received from the neutron detector.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

DETAILED DESCRIPTION

Disclosed are methods and apparatus for installing and supporting electronics and component packages in downhole tools, particularly within cavities of housings that are configured to contain the electronics. Various embodiments herein are directed to hydraulic frames and support systems that enable easy installation, removable, and secure clamping within the housing. Embodiments described herein are directed to hydraulic systems with master-slave hydraulic assemblies.

Figure 1A:
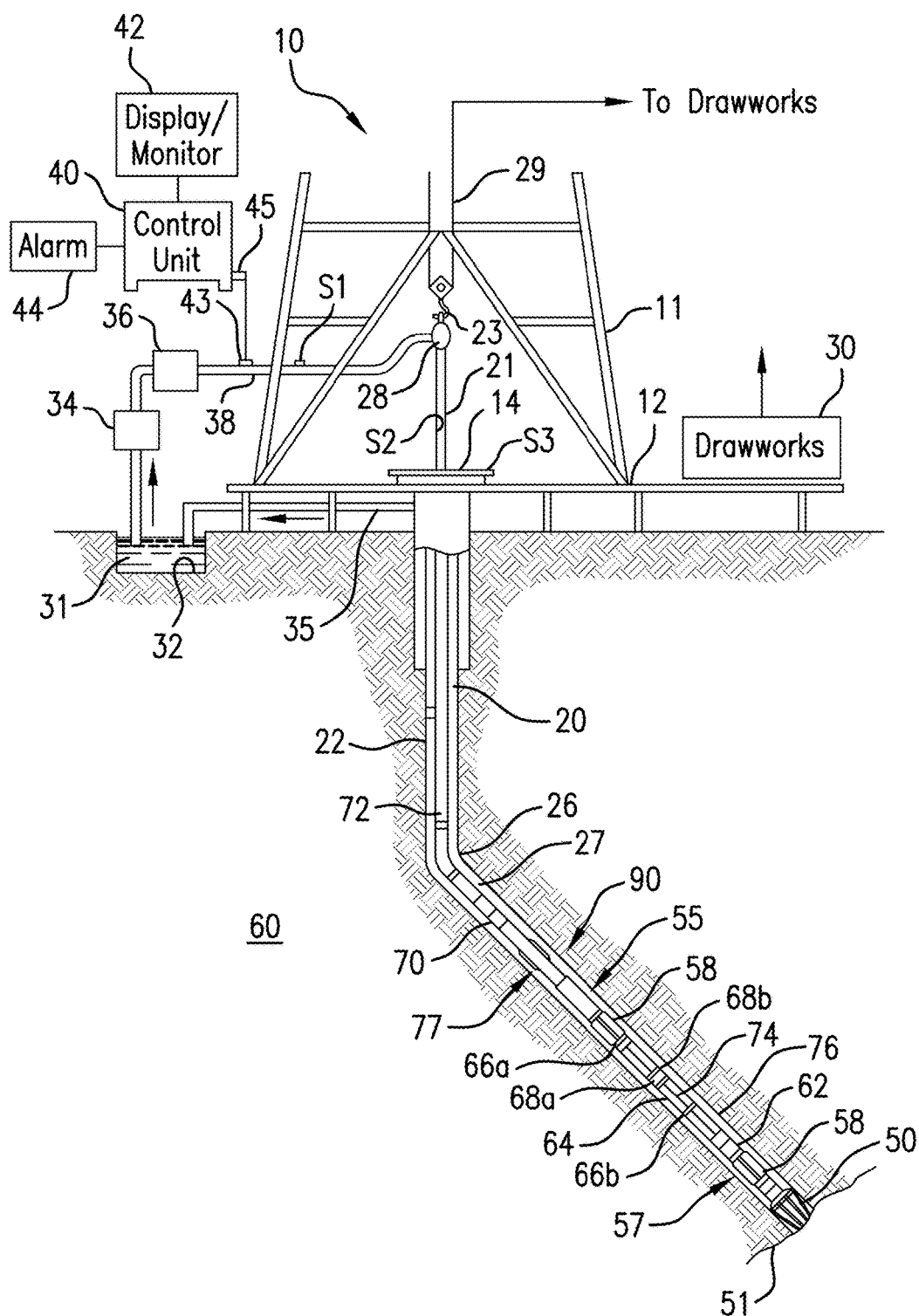
FIG. 1A is an example drilling system that can employ embodiments of the present disclosure.

FIG. 1A shows a schematic diagram of a drilling system 10 that includes a drill string 20 having a drilling assembly 90, also referred to as a bottomhole assembly (BHA), conveyed in a borehole 26 penetrating an earth formation 60. The drilling system 10 includes a conventional derrick 11 erected on a floor 12 that supports a rotary table 14 that is rotated by a prime mover, such as an electric motor (not shown), at a desired rotational speed. The drill string 20 includes a drilling tubular 22, such as a drill pipe, extending downward from the rotary table 14 into the borehole 26. A disintegrating tool 50, such as a drill bit attached to the end of the BHA 90, disintegrates the geological formations when it is rotated to drill the borehole 26. The drill string 20 is coupled to a drawworks 30 via a kelly joint 21, swivel 28 and line 29 through a pulley 23. During the drilling operations, the drawworks 30 is operated to control the weight on bit, which affects the rate of penetration. The operation of the drawworks 30 is well known in the art and is thus not described in detail herein.

During drilling operations a suitable drilling fluid 31 (also referred to as the "mud") from a source or mud pit 32 is circulated under pressure through the drill string 20 by a mud pump 34. The drilling fluid 31 passes into the drill string 20 via a desurger 36, fluid line 38 and the kelly joint 21. The drilling fluid 31 is discharged at the borehole bottom 51 through an opening in the disintegrating tool 50. The drilling fluid 31 circulates uphole through the annular space 27 between the drill string 20 and the borehole 26 and returns to the mud pit 32 via a return line 35. A sensor S1 in the line 38 provides information about the fluid flow rate. A surface torque sensor S2 and a sensor S3 associated with the drill string 20 respectively provide information about the torque and the rotational speed of the drill string. Additionally, one or more sensors (not shown) associated with line 29 are used to provide the hook load of the drill string 20 and about other desired parameters relating to the drilling of the wellbore 26. The system may further include one or more downhole sensors 70 located on the drill string 20 and/or the BHA 90.

In some applications the disintegrating tool 50 is rotated by only rotating the drill pipe 22. However, in other applications, a drilling motor 55 (mud motor) disposed in the drilling assembly 90 is used to rotate the disintegrating tool 50 and/or to superimpose or supplement the rotation of the drill string 20. In either case, the rate of penetration (ROP) of the disintegrating tool 50 into the borehole 26 for a given formation and a drilling assembly largely depends upon the weight on bit and the drill bit rotational speed. In one aspect of the embodiment of FIG. 1A, the mud motor 55 is coupled to the disintegrating tool 50 via a drive shaft (not shown) disposed in a bearing assembly 57. The mud motor 55 rotates the disintegrating tool 50 when the drilling fluid 31 passes through the mud motor 55 under pressure. The bearing assembly 57 supports the radial and axial forces of the disintegrating tool 50, the downthrust of the drilling motor and the reactive upward loading from the applied weight on bit. Stabilizers 58 coupled to the bearing assembly 57 and other suitable locations act as centralizers for the lowermost portion of the mud motor assembly and other such suitable locations.

A surface control unit 40 receives signals from the downhole sensors 70 and devices via a sensor 43 placed in the fluid line 38 as well as from sensors S1, S2, S3, hook load sensors and any other sensors used in the system and processes such signals according to programmed instructions provided to the surface control unit 40. The surface control unit 40 displays desired drilling parameters and other information on a display/monitor 42 for use by an operator at the rig site to control the drilling operations. The surface control unit 40 contains a computer, memory for storing data, computer programs, models and algorithms accessible to a processor in the computer, a recorder, such as tape unit, memory unit, etc. for recording data and other peripherals. The surface control unit 40 also may include simulation models for use by the computer to processes data according to programmed instructions. The control unit responds to user commands entered through a suitable device, such as a keyboard. The control unit 40 is adapted to activate alarms 44 when certain unsafe or undesirable operating conditions occur.

The drilling assembly 90 also contains other sensors and devices or tools for providing a variety of measurements relating to the formation surrounding the borehole and for drilling the wellbore 26 along a desired path. Such devices may include a device for measuring the formation resistivity near and/or in front of the drill bit, a gamma ray device for measuring the formation gamma ray intensity and devices for determining the inclination, azimuth and position of the drill string. A formation resistivity tool 64, made according an embodiment described herein may be coupled at any suitable location, including above a lower kick-off subassembly 62, for estimating or determining the resistivity of the formation near or in front of the disintegrating tool 50 or at other suitable locations. An inclinometer 74 and a gamma ray device 76 may be suitably placed for respectively determining the inclination of the BHA and the formation gamma ray intensity. Any suitable inclinometer and gamma ray device may be utilized. In addition, an azimuth device (not shown), such as a magnetometer or a gyroscopic device, may be utilized to determine the drill string azimuth. Such devices are known in the art and therefore are not described in detail herein. In the above-described exemplary configuration, the mud motor 55 transfers power to the disintegrating tool 50 via a hollow shaft that also enables the drilling fluid to pass from the mud motor 55 to the disintegrating tool 50. In an alternative embodiment of the drill string 20, the mud motor 55 may be coupled below the resistivity measuring device 64 or at any other suitable place.

Still referring to FIG. 1A, other logging-while-drilling (LWD) devices (generally denoted herein by numeral 77), such as devices for measuring formation porosity, permeability, density, rock properties, fluid properties, etc. may be placed at suitable locations in the drilling assembly 90 for providing information useful for evaluating the subsurface formations along borehole 26. Such devices may include, but are not limited to, acoustic tools, nuclear tools, nuclear magnetic resonance tools and formation testing and sampling tools.

The above-noted devices transmit data to a downhole telemetry system 72, which in turn transmits the received data uphole to the surface control unit 40. The downhole telemetry system 72 also receives signals and data from the surface control unit 40 and transmits such received signals and data to the appropriate downhole devices. In one aspect, a mud pulse telemetry system may be used to communicate data between the downhole sensors 70 and devices and the surface equipment during drilling operations. A transducer 43 placed in the mud supply line 38 detects the mud pulses responsive to the data transmitted by the downhole telemetry 72. Transducer 43 generates electrical signals in response to the mud pressure variations and transmits such signals via a conductor 45 to the surface control unit 40. In other aspects, any other suitable telemetry system may be used for two-way data communication between the surface and the BHA 90, including but not limited to, an acoustic telemetry system, an electro-magnetic telemetry system, a wireless telemetry system that may utilize repeaters in the drill string or the wellbore and a wired pipe. The wired pipe may be made up by joining drill pipe sections, wherein each pipe section includes a data communication link that runs along the pipe. The data connection between the pipe sections may be made by any suitable method, including but not limited to, hard electrical or optical connections, induction, capacitive or resonant coupling methods. In case a coiled-tubing is used as the drill pipe 22, the data communication link may be run along a side of the coiled-tubing.

The drilling system described thus far relates to those drilling systems that utilize a drill pipe to conveying the drilling assembly 90 into the borehole 26, wherein the weight on bit is controlled from the surface, typically by controlling the operation of the drawworks. However, a large number of the current drilling systems, especially for drilling highly deviated and horizontal wellbores, utilize coiled-tubing for conveying the drilling assembly downhole. In such application a thruster is sometimes deployed in the drill string to provide the desired force on the drill bit. Also, when coiled-tubing is utilized, the tubing is not rotated by a rotary table but instead it is injected into the wellbore by a suitable injector while the downhole motor, such as mud motor 55, rotates the disintegrating tool 50. For offshore drilling, an offshore rig or a vessel is used to support the drilling equipment, including the drill string.

Still referring to FIG. 1A, a resistivity tool 64 may be provided that includes, for example, a plurality of antennas including, for example, transmitters 66a or 66b or and receivers 68a or 68b. Resistivity can be one formation property that is of interest in making drilling decisions. Those of skill in the art will appreciate that other formation property tools can be employed with or in place of the resistivity tool 64.

Figure 1B:
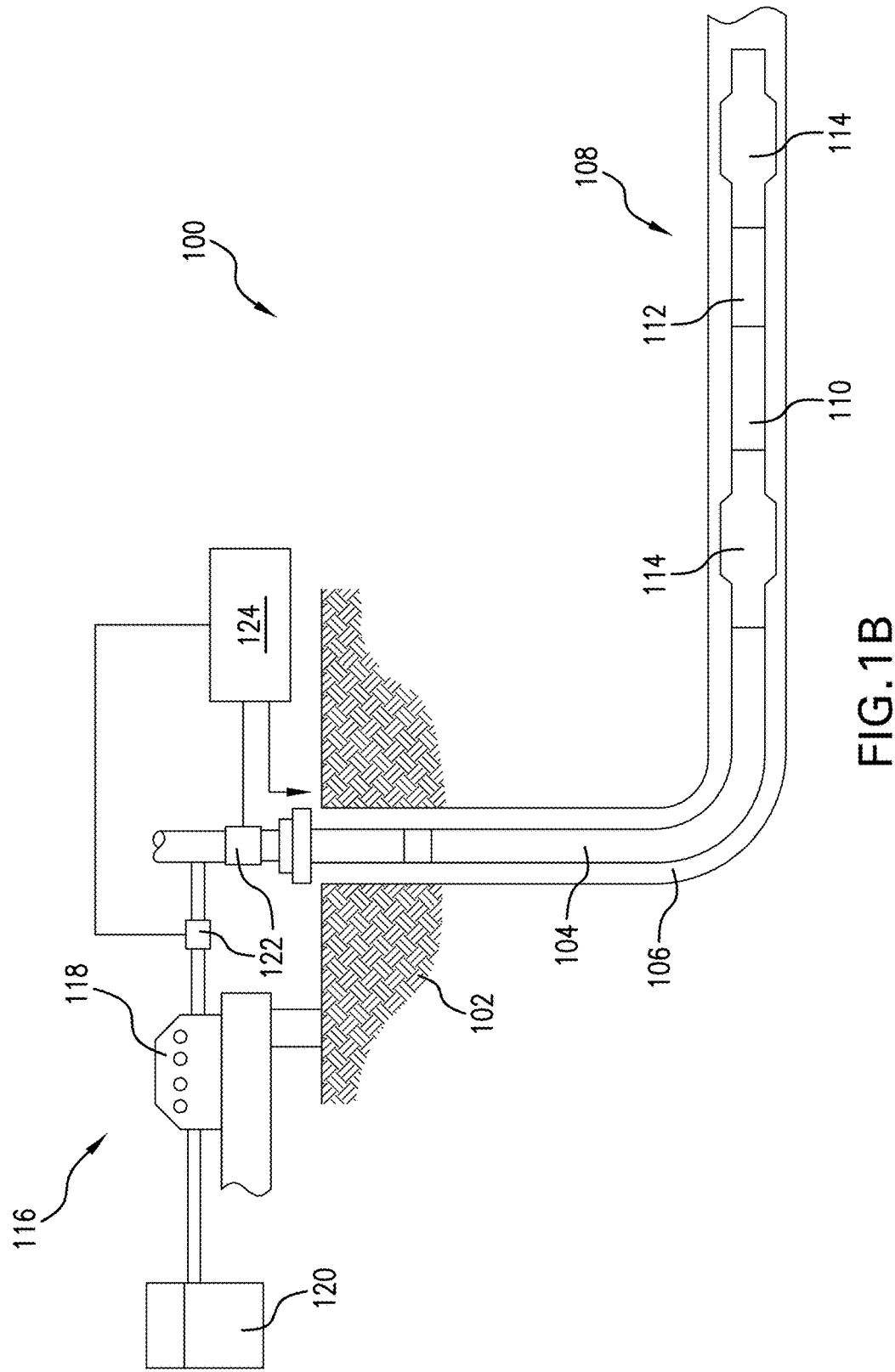
FIG. 1B depicts a system for formation stimulation and hydrocarbon production that can incorporate embodiments of the present disclosure.

Turning now to FIG. 1B, a schematic illustration of an embodiment of a system 100 for hydrocarbon production and/or evaluation of an earth formation 102 that can employ embodiments of the present disclosure is shown. The system 100 includes a borehole string 104 disposed within a borehole 106. The string 104, in one embodiment, includes a plurality of string segments or, in other embodiments, is a continuous conduit such as a coiled tube. As described herein, "string" refers to any structure or carrier suitable for lowering a tool or other component through a borehole or connecting a drill bit to the surface, and is not limited to the structure and configuration described herein. The term "carrier" as used herein means any device, device component, combination of devices, media, and/or member that may be used to convey, house, support, or otherwise facilitate the use of another device, device component, combination of devices, media, and/or member. Example, non-limiting carriers include, but are not limited to, casing pipes, wirelines, wireline sondes, slickline sondes, drop shots, downhole subs, bottomhole assemblies, and drill strings.

In one embodiment, the system 100 is configured as a hydraulic stimulation system. As described herein, "stimulation" may include any injection of a fluid into a formation. A fluid may be any flowable substance such as a liquid or a gas, or a flowable solid such as sand. In such embodiment, the string 104 includes a downhole assembly 108 that includes one or more tools or components to facilitate stimulation of the formation 102. For example, the string 104 includes a fluid assembly 110, such as a fracture or "frac" sleeve device or an electrical submersible pumping system, and a perforation assembly 112. Examples of the perforation assembly 112 include shaped charges, torches, projectiles, and other devices for perforating a borehole wall and/or casing. The string 104 may also include additional components, such as one or more isolation or packer subs 114.

One or more of the downhole assembly 108, the fracturing assembly 110, the perforation assembly 112, and/or the packer subs 114 may include suitable electronics or processors configured to communicate with a surface processing unit and/or control the respective tool or assembly. A surface system 116 can be provided to extract material (e.g., fluids) from the formation 102 or to inject fluids through the string 104 into the formation 102 for the purpose of fracing.

As shown, the surface system 116 includes a pumping device 118 in fluid communication with a tank 120. In some embodiments, the pumping device 118 can be used to extract fluid, such as hydrocarbons, from the formation 102, and store the extracted fluid in the tank 120. In other embodiments, the pumping device 118 can be configured to inject fluid from the tank 120 into the string 104 to introduce fluid into the formation 102, for example, to stimulate and/or fracture the formation 102.

One or more flow rate and/or pressure sensors 122, as shown, are disposed in fluid communication with the pumping device 118 and the string 104 for measurement of fluid characteristics. The sensors 122 may be positioned at any suitable location, such as proximate to (e.g., at the discharge output) or within the pumping device 118, at or near a wellhead, or at any other location along the string 104 and/or within the borehole 106.

A processing and/or control unit 124 is disposed in operable communication with the sensors 122, the pumping device 118, and/or components of the downhole assembly 108. The processing and/or control unit 124 is configured to, for example, receive, store, and/or transmit data generated from the sensors 122 and/or the pump 118, and includes processing components configured to analyze data from the pump 118 and the sensors 122, provide alerts to the pump 118 or other control unit and/or control operational parameters, and/or communicate with and/or control components of the downhole assembly 108. The processing and/or control unit 124 includes any number of suitable components, such as processors, memory, communication devices and power sources.

In the configurations of FIGS. 1A-1B, downhole components can include electronic modules or electronic devices that are used for various functions, including, but not limited to, control functions, monitoring functions, communication functions, etc. The electronics can be mounted within a cavity of the downhole system. For example, different sections of tubing, piping, bottomhole assemblies, and/or other downhole structures (e.g., housings, casings, support structures, frames, probe sections, etc.), hereinafter referred to collectively as a "housing." The mounting may be required to secure the electronics within the housing. However, during downhole operations, the electronics and other of the downhole tools and systems may be subject to vibrations or other operational situations and thus the components may suffer wear, fatigue, etc. It may be desirable to monitor such components, particularly critical components including, but not limited to, ESP systems and components, such as a centrifugal pump impeller or diffuser vane, a shaft, a piston rod, a bearing, a stator, a rotator, or a motor blade of an electrical submersible pump, a flow altering device or sealing element of a flow control valve or differential pressure flowmeter, or a sealing element of a packer, pump rods, valves, packers, liners, and general well logging instruments, such as, measurement-while-drilling tools, logging-while-drilling tools, and/or wireline tools.

Although described above with respect to drilling and/or completion services, those of skill in the art will appreciate that embodiments provided herein are applicable to all downhole operations, including, but not limited to drilling, completion, and production operations. Further, although various limited examples may be provided herein, those of skill in the art will appreciate that the teachings provided herein are applicable to a wide variety of applications and the examples are merely provided for illustrative and explanatory purposes.

Accordingly, embodiments provided herein are directed to systems and processes related to downhole or in-well monitoring of components of downhole systems and apparatuses. Specifically, embodiments provided herein are directed to monitoring downhole components using a pulsed neutron tool with the monitored downhole components being doped with a pre-selected neutron absorbent. In various embodiments, such pre-selected neutron absorbents may include, but are not limited to, Boron, Gadolinium, etc. Further, when doping is not possible, a doped coating of the pre-selected neutron absorbent can be applied to the surfaces of the monitored component. As used herein "monitored component" refers to a component that is monitored by a pulsed neutron tool as described below. The monitored component can be any downhole part, piece, component, tool, sub-tool, device, etc. that is desired to be monitored for various reasons. For example, such monitoring can be used for monitoring the component life and/or wear of the monitored component. Wear and failure of components downhole can occur due to many factors, including, but not limited to temperatures, vibrations, operational wear/use, and/or corrosion. Monitoring, as provided herein, can be employed for long-term or long-life components that may be disposed downhole and operational for years and thus subject to a variety of performance impacting events.

The monitored components, e.g., critical components, may have significant neutron capture cross section and therefore can be used as an indicator of the downhole device integrity. That is, by monitoring one or more components of a device, the integrity of the entire device may be monitored. Such monitoring, in accordance with embodiments of the present disclosure, is achieved by the components' capability for absorbing neutrons. To detect the corrosion and mass change of the monitored component, various types of sensors can be provided downhole, including, but not limited to permanent neutron sensors, chemical source neutron tools equipped with a neutron detector, and pulsed neutron tools with pulsed neutron generator and neutron-gamma detector. In the example, of Boron, the neutron absorption cross-section of Boron is thousands of other elements. The neutron absorption, in some configurations, may be monitored by a diamond neutron sensor, which is very robust and small and could be placed on a specific aspect of the monitored component. If the monitored component is in good condition, the diamond neutron sensor will get low neutron count rates. When the monitored component starts to lose mass, the diamond neutron sensor will get higher neutron count rates.

The doping of the monitored component can be provided during the manufacture of the monitored component and/or subparts thereof. For example, a pre-selected neutron absorbent can be incorporated into the materials used for manufacturing the monitored component. Such pre-selected neutron absorbent can be provided into the material in known a quantity, weight-by-volume, or other known measurement. Such known measurement of the pre-selected neutron absorbent can enable specific calibration and monitoring characteristics of the monitored component. For example, given a specific known measurement, through testing and calibration, a particularly monitoring curve or threshold can be established such that when a particular level of absorption is detected, the life and/or wear of the monitored component can be measured. As noted, if doping is not possible, a doped coating can be applied to one or more surfaces of the monitored component to enable the coated parts of the monitored component to provide neutron absorption and thus enable monitoring as provided herein.

In accordance with embodiments of the present disclosure, a neutron source is positioned at a first position relative to the monitored component and a neutron detector is positioned at a second position relative to the monitored component. For example, the neutron source and the neutron detector may be positioned on diametrically opposite sides of the monitored component such that neutrons originating from the neutron source will be required to pass through the monitored component to be detected by the neutron detector.

Figures 2A, 2B:
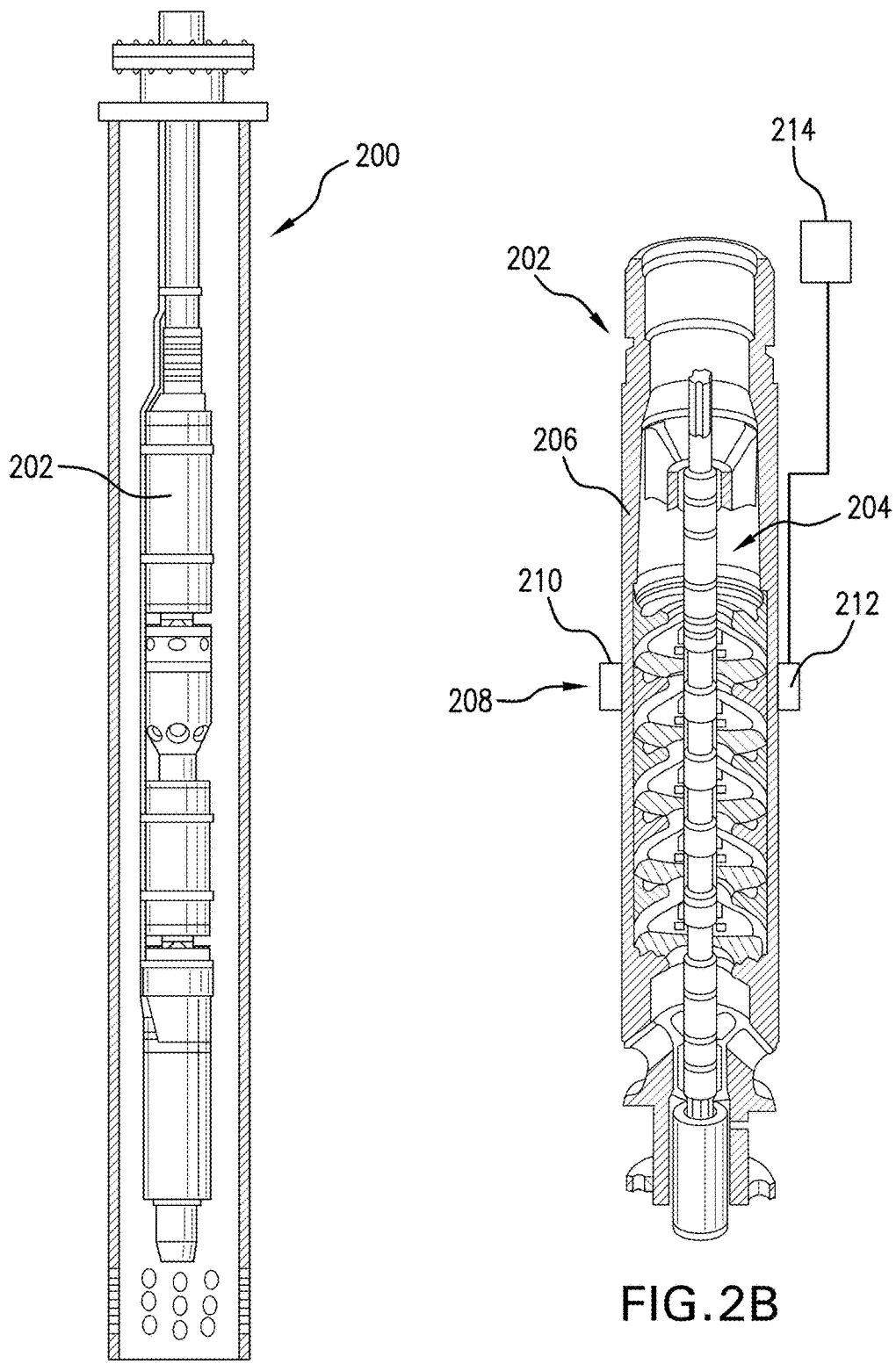
FIG. 2A is a schematic illustration of a downhole tool having a component to be monitored in accordance with an embodiment of the present disclosure.
FIG. 2B is a schematic illustration of the monitored component of FIG. 2A having a neutron monitoring system installed thereto.

For example, turning to FIGS. 2A-2B, schematic illustrations of a downhole tool 200 having a monitored component 202 installed therein are shown. As shown, the monitored component 202 is part of the downhole tool 200. The monitored component 202, as illustratively shown, is an electrical submersible pump having internal components 204. The internal components 204 can be doped and/or coated with a pre-selected neutron absorbent (e.g., Boron, Gadolinium, Americium-Beryllium, etc.). The internal components 204 are housed within a housing 206 of the monitored component 202 which may be part of a housing of the downhole tool 200 or a separate housing therefrom.

To enable monitoring of the monitored component 202 (e.g., internal components 204 or any other part of the monitored component 202), a neutron monitoring system 208 is provided relative to the monitored component 202. As shown, the neutron monitoring system includes a neutron source 210 mounted to the housing 206 of the monitored component 202. Positioned away from the neutron source 210 and relative to the doped internal components 204 is a neutron detector 212. The neutron detector 212 can be operably connected to and/or otherwise in communication with a controller or control unit 214. The control unit 214 includes a processor and/or memory and can be configured to receive neutron count information from the neutron detector 212. The control unit 214 can calculate and/or determine a component life and/or wear based on the neutron count information. In some embodiments, the control unit 214 can be part of downhole electronics and/or other devices located downhole (including integrally assembled with the neutron detector 212). In such embodiments, the control unit 214 can be operably connected to or otherwise in communication with a surface control unit (e.g., surface control unit 40 shown in FIG. 1A). In other embodiments, the neutron count information may be communicated directly to the surface, and in such embodiments the control unit 214 may be located on the surface (e.g., the control unit 214 may be the surface control unit 40 shown in FIG. 1A or a part thereof).

The neutron source 210 can be a focused neutron source, such as configured with shielding or other properties to direct the neutrons generated therefrom toward the neutron detector 212, or the neutron source 210 can emit neutrons in all directions. As shown, the neutron detector 212 is positioned such that the monitored component 202 (and the doped internal components 204 thereof) is located between the neutron detector 212 and the neutron source 210.

To enable monitoring of the monitored component 202, the neutron detector 212 detects an amount or neutrons that reach the neutron detector 212 from the neutron source 210. Because the monitored component 204 includes a pre-selected neutron absorbent at least a portion of the neutrons generated by the neutron source 210 will be absorbed by the pre-selected neutron absorbent and thus not all neutrons generated by the neutron source 210 and traveling toward the neutron detector 212 will reach the neutron detector 212. By measuring the amount of neutrons detected by the neutron detector 212, an estimate regarding the status and/or life of the monitored component 202 can be made.

Although shown in FIG. 2B with the neutron source 210 and the neutron detector 212 mounted to the housing 206 of the monitored component 202, various other configurations of the neutron monitoring system are possible without departing from the scope of the present disclosure. For example, one or both of the source and detector may be mounted on an interior surface of the housing of the monitored component. In other arrangements, one or both of the source and the detector can be mounted to an external housing (e.g., a housing of the downhole tool 200). Further, although shown with the source and detector positioned radially with respect to an axis of the downhole tool, other arrangement can be employed. For example, the source and the detector can be positioned at opposing axial ends of a monitored component.

As noted above, the neutron monitoring system can include a chemical neutron source that is provided to enable monitoring of the monitored component. The chemical neutron source is installed within a part of a downhole tool sufficiently close to the monitored component to enable detection and monitoring thereof (e.g., as shown in FIG. 2B). In one non-limiting example, the chemical neutron source can be Americium-Beryllium (Am—Be) although other chemical neutron sources may be used without departing from the scope of the present disclosure. The chemical neutron source emits neutrons that may be absorbed by the monitored device due to the doping and/or coating of the applied pre-selected neutron absorbent to the monitored device. A neutron detector is used to monitor neutron counts. If the monitored component is in good condition, the neutron detector will detect and/or record low neutron counts that maybe pre-identified or pre-determined based on modelling, calculations, and/or testing. However, when the monitored component loses mass, such as due to life wear and/or damage, the neutron detector will start to record higher neutron counts. By analyzing the difference between the count rates, an understanding regarding the loss of mass of the monitored component can be achieved.

Figure 3:
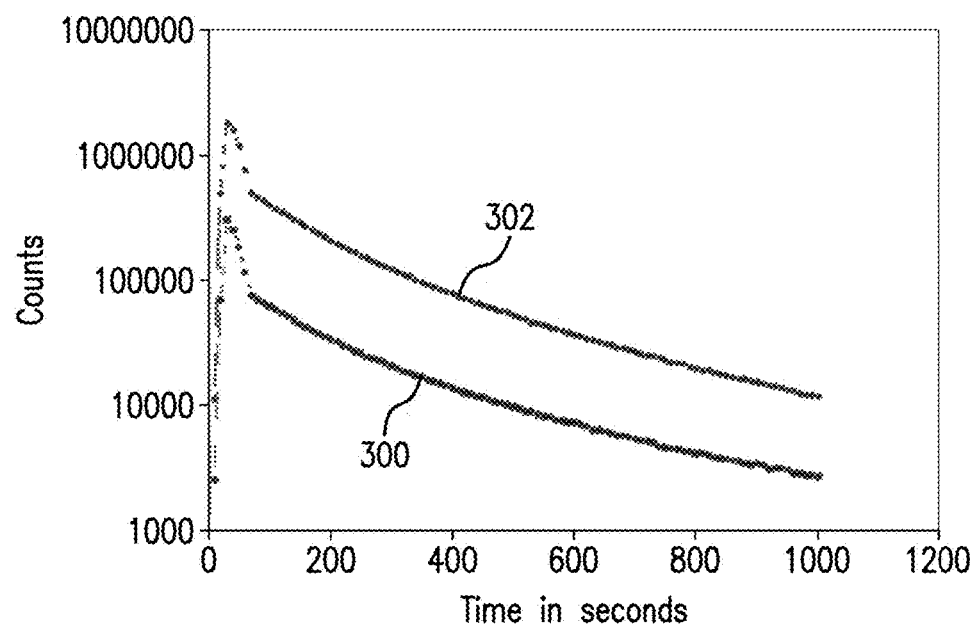
FIG. 3 is a schematic plot illustrating neutron counts between a new and a used component.

For example, as shown in FIG. 3, curve 300 represents a neutron count recorded when the doped monitored component is in good condition (e.g., new). In FIG. 3, the vertical axis represents counts (arbitrary units) recorded by a detector and the horizontal axis represents time information. The time decaying signal represents the decay counts detected for each neutron pulse when a pulsed neutron source is implemented. As shown, as the monitored component is used and loses mass, the neutron count will decrease, illustrated as curve 302 representing the neutron count when the doped monitored component encounters a mass loss. The loss in mass results in a loss of the pre-selected neutron absorbent that is present between the source and the detector, and thus a higher count of neutrons will not be absorbed by the pre-selected neutron absorbent but rather will reach the detector and be counted.

Another neutron monitoring system can include a pulsed neutron instrument with a pulsed neutron generator and the detector may be a neutron gamma detector. In one non-limiting example of such a configuration, the pulsed neutron tool can be configured to emit high energy (e.g., 14.2 MeV) neutrons that interact with the doping element (e.g., doped material and/or coating) and a characteristic energy peak will be generated. This energy peak could be induced by either neutron-gamma inelastic or capture interaction. Using Monte Carlo stochastic particle simulation, energy spectra may be obtained for various cases to enable monitoring. For example, case (1) may be measurements and/or simulation of no doping element is present on the monitored component and case (2) may be a monitored component having a doping element applied thereto (e.g., doped within material of component and/or coated) and in new condition. By interpolating the measured spectra of case (1) and case (2), it is possible to identify the loss of mass of the monitored component by analyzing the position of a measured energy peak.

As used herein, a neutron gamma detector encompasses various types of detectors, as will be appreciated by those of skill in the art. For example, the term neutron gamma detector can be a neutron detector, a gamma detector, or a gamma detector for neutron induced gamma rays. Accordingly, the term "neutron gamma detector" is not to be limited to a single type of detector but rather encompasses a variety of detection devices and/or mechanisms. Moreover, a variety of types of detector structures and components may be employed without departing from the scope of the present disclosure. For example, in some embodiments, for gamma-ray detection, a detector may be a scintillation crystal and photomultiplier tube detector. In other embodiments, for example for neutron detection, without limitation, diamond detectors, Helium-3 gas detectors, or scintillation crystal containing Lithium and photomultiplier tube detectors may be employed.

Figure 4:
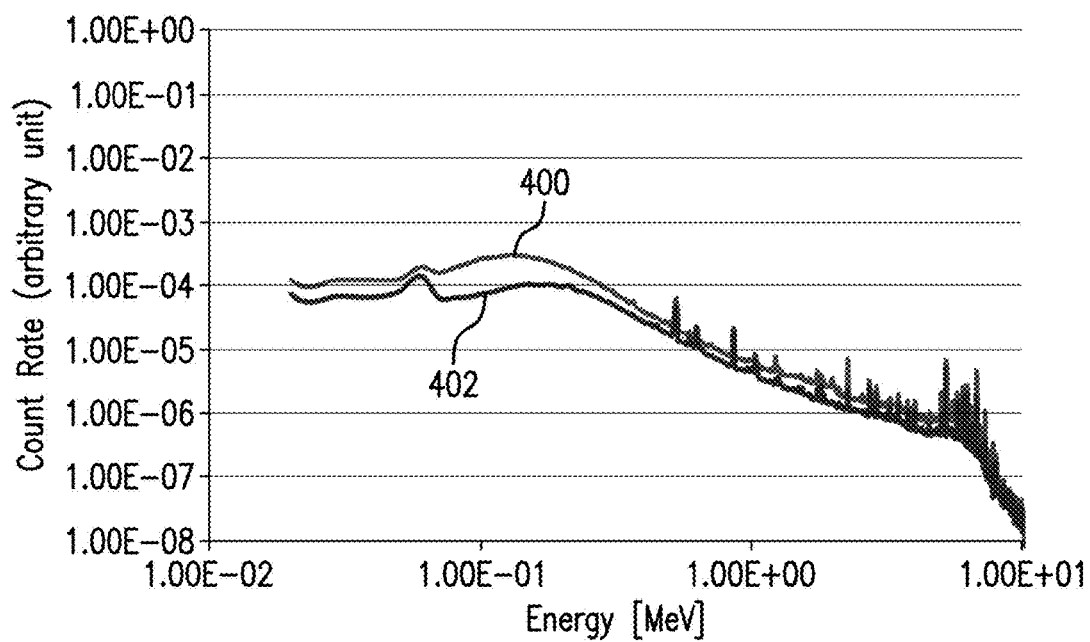
FIG. 4 is a schematic plot illustrating spectra of measurements comparing a doped component and a non-doped component in accordance with an embodiment of the present disclosure.

As shown in FIG. 4 curve 400 represents modelled spectra with no neutron absorbent (e.g., case (1)) and curve 402 represents modelled spectra with neutron absorbent assuming the doped monitored component is in perfect shape (e.g., case (2)). In FIG. 4, the vertical axis is count rate (arbitrary unit) and the horizontal axis is energy in MeV. By interpolating the measured spectra of the doped monitored component in between these two curves 400, 402, the actual loss of mass of the monitored component can be identified.

Another neutron monitoring system can include a permanent neutron sensor. For example, a diamond detector can be installed on or very close to the monitored component or a portion thereof to monitor a change in neutron counts consistently based on the similar principles explained above. This application could also be combined with chemical neutron sources and/or pulsed neutron generators.

Figure 5:
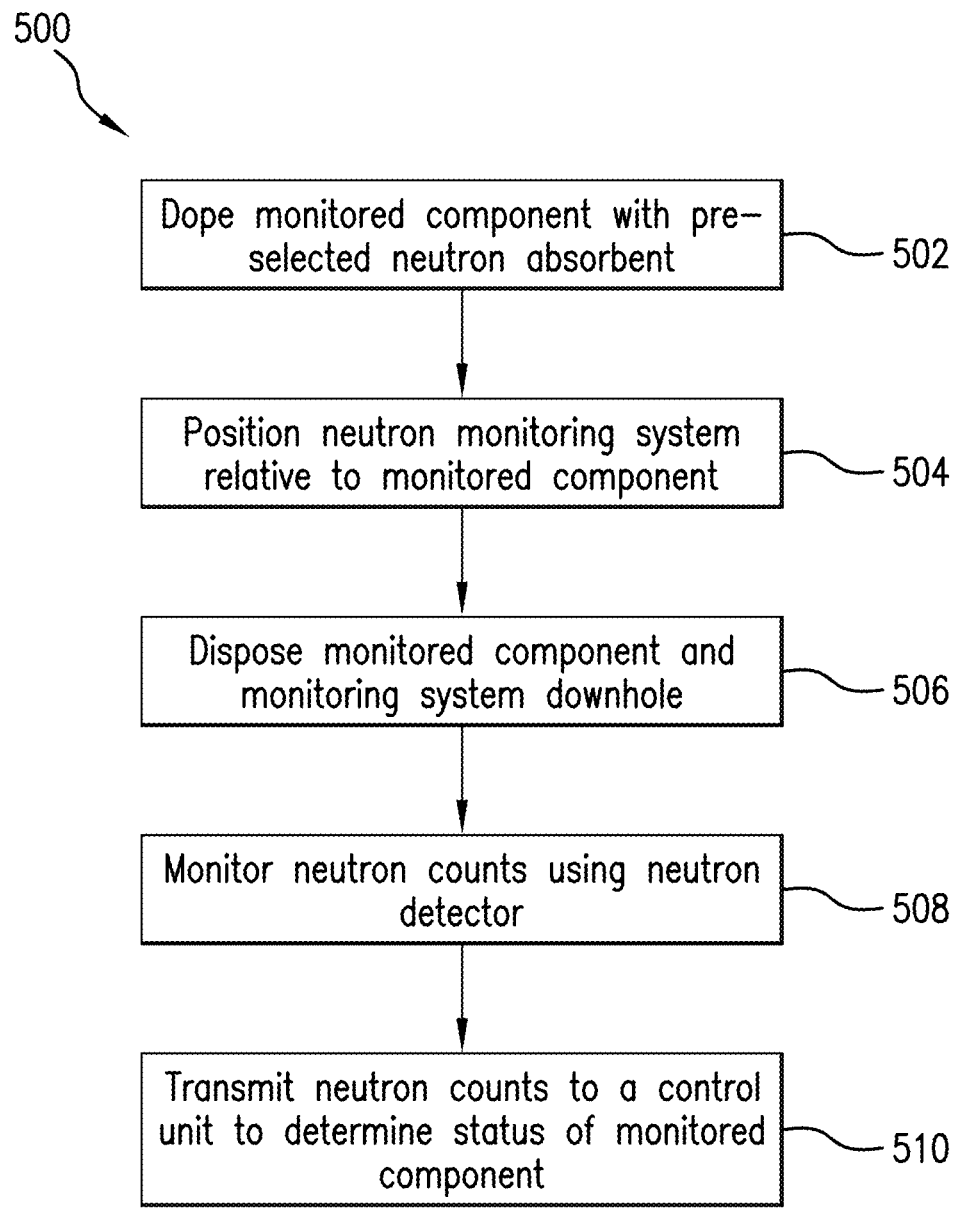
FIG. 5 is a flow process for monitoring a downhole component in accordance with an embodiment of the present disclosure.

Turning now to FIG. 5, a flow process 500 for monitoring a monitored component (e.g., critical component) using a neutron monitoring system in accordance with the present disclosure is shown. The flow process 500 can be used for monitoring the life and/or wear of various components and/or parts of downhole tools, with the monitoring performed downhole. The flow process 500 can be used with the above described neutron monitoring system and/or variations thereof. The flow process employs a neutron source, a doped monitored component (doped material and/or coated), a neutron detector, and a control unit.

At block 502, a component to be monitored is doped with a pre-selected neutron absorbent. The pre-selected neutron absorbent may be an element or compound that absorbs neutrons. The doping can be achieved through mixing the pre-selected neutron absorbent into the material that is used to manufacture the component to be monitored (e.g., integrally doped) or the doping may be achieved through a doped coating that is applied to surfaces of the component to be monitored.

At block 504, a neutron monitoring system is positioned relative to the monitored component. Such positioning can include locating a neutron source at a first location relative to the monitored component and locating a neutron detector at a second location relative to the monitored component. In some configurations, the first and second location may be on opposing sides of the monitored component such that neutrons generated from the neutron source will travel through the monitored component to reach the neutron detector. The neutron monitoring system, in some embodiments, can include a control unit that is installed relative to the monitored component to enable communication between at least the neutron detector and the control unit.

At block 506, the monitored component and neutron monitoring system are disposed downhole. Such disposal downhole can include disposition during a drilling operation, installation by wireline, drill string, or other types of running apparatus, or by other means and/or mechanisms.

At block 508, the neutron monitoring system is used to monitor neutron counts. The neutron counts represent the number of neutrons detected at the neutron detector of the neutron monitoring system. The neutrons are generated at the neutron source of the neutron monitoring system and as the neutrons pass through the monitored component the neutron detector detects the presence and counts the neutrons. Because the monitored component includes the pre-selected neutron absorbent doping, when first installed, a maximum number of neutrons will be absorbed and prevented from reaching the neutron detector. However, as the monitored component is operated and subject to downhole conditions and environment, the monitored component may lose mass and degrade. Such degradation and loss of mass will include a loss of the pre-selected neutron absorbent doping, and thus the number of counted neutrons will increase at the neutron detector.

At block 510, the neutron counts are transmitted to a control unit to determine the status of the monitored component. The control unit may be integral with the neutron detector, and the communication may be through a bus of the combined unit. However, in other configurations, the control unit may be located remote from the neutron detector (downhole or at the surface) and in such configurations the neutron count information may be conveyed by wire or wirelessly from the neutron detector to the control unit. The determination regarding the status of the monitored component can be a comparison between the detected neutron count at the neutron detector and a predetermined threshold value, curve, digital signature, spectra, etc. The predetermined thresholds can be determined through modeling, testing, etc.

By performing flow process 500, the health of a monitored component can be monitored over the life of the component while it is disposed downhole and in operation. Accordingly, the monitored component can be tracked to ensure proper operation of the component. Further, detection of failures and/or breakages of the monitored component can be achieved, thus enabling proper shut down of a downhole operation and/or replacement of the monitored component if necessary.

Advantageously, embodiments of the present disclosure enable downhole operation of critical components using neutron monitoring. By monitoring neutron counts, life and status of a component can be monitored. Such downhole monitoring enables efficient and accurate health monitoring of the monitored components.

Embodiment 1: A downhole component monitoring system is provided. The system includes a monitored component doped with a pre-selected neutron absorbent, the monitored component being part of a downhole tool; a neutron monitoring system positioned relative to the monitored component, the neutron monitoring system comprising: a neutron source positioned at a first location relative to the monitored component; a neutron detector positioned at a second location relative to the monitored component, the neutron detector configured to detect neutrons from the neutron source and count said detected neutrons; and a control unit in communication with the neutron detector and configured to determine a status of the monitored component from the neutron count received from the neutron detector.

Embodiment 2: The downhole component monitoring system of any of the embodiments described herein, wherein the control unit and the neutron detector form an integral unit.

Embodiment 3: The downhole component monitoring system of any of the embodiments described herein, wherein the control unit is located on the surface.

Embodiment 4: The downhole component monitoring system of any of the embodiments described herein, wherein the doping comprises at least one of (i) a coating applied to a surface of the monitored component or (ii) the pre-selected neutron absorbent is manufactured within a material of the monitored component.

Embodiment 5: The downhole component monitoring system of any of the embodiments described herein, wherein the pre-selected neutron absorbent is at least one of Boron, Gadolinium, and Americium-Beryllium.

Embodiment 6: The downhole component monitoring system of any of the embodiments described herein, wherein the neutron monitoring system includes a chemical neutron source.

Embodiment 7: The downhole component monitoring system of any of the embodiments described herein, wherein the neutron monitoring system includes a pulsed neutron generator and a neutron gamma detector.

Embodiment 8: The downhole component monitoring system of any of the embodiments described herein, wherein the monitored component is at least one of a centrifugal pump impeller or diffuser vane, a shaft, a piston rod, a bearing, a stator, a rotator, or a motor blade of an electrical submersible pump, a flow altering device or sealing element of a flow control valve or differential pressure flowmeter, or a sealing element of a packer Embodiment 9: The downhole component monitoring system of any of the embodiments described herein, wherein the control unit compares a neutron count against at least one of a predetermined threshold, a known spectra, and a known curve.

Embodiment 10: The downhole component monitoring system of any of the embodiments described herein, wherein the first location and the second location are on opposing sides of the monitored component such that neutrons from the neutron source must pass through the monitored component to be detected at the neutron detector.

Embodiment 11: A method for monitoring a component of a downhole tool, is provided. The method includes doping a component to be monitored with a pre-selected neutron absorbent, the monitored component being part of a downhole tool; positioning a neutron monitoring system relative to the monitored component, the neutron monitoring system comprising: a neutron source positioned at a first location relative to the monitored component; a neutron detector positioned at a second location relative to the monitored component, the neutron detector configured to detect neutrons from the neutron source and count said detected neutrons; receiving a neutron count at a control unit that is in communication with the neutron detector; and determining a status of the monitored component from the neutron count received from the neutron detector.

Embodiment 12: The method of any of the embodiments described herein, wherein the control unit and the neutron detector form an integral unit.

Embodiment 13: The method of any of the embodiments described herein, wherein the control unit is located on the surface.

Embodiment 14: The method of any of the embodiments described herein, wherein the doping comprises at least one of (i) coating a surface of the monitored component with a coating having the pre-selected neutron absorbent or (ii) manufacturing the pre-selected neutron absorbent within a material of the monitored component.

Embodiment 15: The method of any of the embodiments described herein, wherein the pre-selected neutron absorbent is at least one of Boron, Gadolinium, and Americium-Beryllium.

Embodiment 16: The method of any of the embodiments described herein, wherein the neutron monitoring system includes a chemical neutron source.

Embodiment 17: The method of any of the embodiments described herein, wherein the neutron monitoring system includes a pulsed neutron generator and a neutron gamma detector.

Embodiment 18: The method of any of the embodiments described herein, wherein the monitored component is at least one of a centrifugal pump impeller or diffuser vane, a shaft, a piston rod, a bearing, a stator, a rotator, or a motor blade of an electrical submersible pump, a flow altering device or sealing element of a flow control valve or differential pressure flowmeter, or a sealing element of a packer Embodiment 19: The method of any of the embodiments described herein, further comprising comparing a neutron count against at least one of a predetermined threshold, a known spectra, and a known curve.

Embodiment 20: The method of any of the embodiments described herein, wherein the first location and the second location are on opposing sides of the monitored component such that neutrons from the neutron source must pass through the monitored component to be detected at the neutron detector.

In support of the teachings herein, various analysis components may be used including a digital and/or an analog system. For example, controllers, computer processing systems, and/or geo-steering systems as provided herein and/or used with embodiments described herein may include digital and/or analog systems. The systems may have components such as processors, storage media, memory, inputs, outputs, communications links (e.g., wired, wireless, optical, or other), user interfaces, software programs, signal processors (e.g., digital or analog) and other such components (e.g., such as resistors, capacitors, inductors, and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (e.g., ROMs, RAMs), optical (e.g., CD-ROMs), or magnetic (e.g., disks, hard drives), or any other type that when executed causes a computer to implement the methods and/or processes described herein. These instructions may provide for equipment operation, control, data collection, analysis and other functions deemed relevant by a system designer, owner, user, or other such personnel, in addition to the functions described in this disclosure. Processed data, such as a result of an implemented method, may be transmitted as a signal via a processor output interface to a signal receiving device. The signal receiving device may be a display monitor or printer for presenting the result to a user. Alternatively or in addition, the signal receiving device may be memory or a storage medium. It will be appreciated that storing the result in memory or the storage medium may transform the memory or storage medium into a new state (i.e., containing the result) from a prior state (i.e., not containing the result). Further, in some embodiments, an alert signal may be transmitted from the processor to a user interface if the result exceeds a threshold value.

Furthermore, various other components may be included and called upon for providing for aspects of the teachings herein. For example, a sensor, transmitter, receiver, transceiver, antenna, controller, optical unit, electrical unit, and/or electromechanical unit may be included in support of the various aspects discussed herein or in support of other functions beyond this disclosure.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The flow diagram(s) depicted herein is just an example. There may be many variations to this diagram or the steps (or operations) described therein without departing from the scope of the present disclosure. For instance, the steps may be performed in a differing order, or steps may be added, deleted or modified. All of these variations are considered a part of the present disclosure.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the present disclosure.

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While embodiments described herein have been described with reference to various embodiments, it will be understood that various changes may be made and equivalents may be substituted for elements thereof without departing from the scope of the present disclosure. In addition, many modifications will be appreciated to adapt a particular instrument, situation, or material to the teachings of the present disclosure without departing from the scope thereof. Therefore, it is intended that the disclosure not be limited to the particular embodiments disclosed as the best mode contemplated for carrying the described features, but that the present disclosure will include all embodiments falling within the scope of the appended claims.

Accordingly, embodiments of the present disclosure are not to be seen as limited by the foregoing description, but are only limited by the scope of the appended claims.

What is claimed is:

1. A downhole component monitoring system comprising:
a monitored component doped with a pre-selected neutron absorbent, the monitored component being part of a downhole tool;
a neutron monitoring system positioned relative to the monitored component, the neutron monitoring system comprising:
a neutron source positioned at a first location relative to the monitored component;
a neutron detector positioned at a second location relative to the monitored component, the neutron detector configured to detect neutrons from the neutron source and count said detected neutrons; and
a control unit in communication with the neutron detector and configured to determine a status of the monitored component from the neutron count received from the neutron detector,
wherein the monitored component is at least one of a centrifugal pump impeller or diffuser vane, a shaft, a piston rod, a bearing, a stator, a rotator, or a motor blade of an electrical submersible pump, a flow altering device or sealing element of a flow control valve or differential pressure flowmeter, or a sealing element of a packer, and
wherein the first location and the second location are on opposing sides of the monitored component such that neutrons from the neutron source must pass through the monitored component to be detected at the neutron detector.

2. The downhole component monitoring system of claim 1, wherein the control unit and the neutron detector form an integral unit.

3. The downhole component monitoring system of claim 1, wherein the control unit is located on the surface.

4. The downhole component monitoring system of claim 1, wherein the doping comprises at least one of (i) a coating applied to a surface of the monitored component or (ii) the pre-selected neutron absorbent is manufactured within a material of the monitored component.

5. The downhole component monitoring system of claim 1, wherein the pre-selected neutron absorbent is at least one of Boron, Gadolinium, and Americium-Beryllium.

6. The downhole component monitoring system of claim 1, wherein the neutron monitoring system includes a chemical neutron source.

7. The downhole component monitoring system of claim 1, wherein the neutron monitoring system includes a pulsed neutron generator and a neutron gamma detector.

8. The downhole component monitoring system of claim 1, wherein the control unit compares a neutron count against at least one of a predetermined threshold, a known spectra, and a known curve.

9. A method for monitoring a component of a downhole tool, the method comprising:
  doping a component to be monitored with a pre-selected neutron absorbent, the monitored component being part of a downhole tool;
  positioning a neutron monitoring system relative to the monitored component, the neutron monitoring system comprising:
    a neutron source positioned at a first location relative to the monitored component;
    a neutron detector positioned at a second location relative to the monitored component, the neutron detector configured to detect neutrons from the neutron source and count said detected neutrons;
  receiving a neutron count at a control unit that is in communication with the neutron detector; and
  determining a status of the monitored component from the neutron count received from the neutron detector,
  wherein the monitored component is at least one of a centrifugal pump impeller or diffuser vane, a shaft, a piston rod, a bearing, a stator, a rotator, or a motor blade of an electrical submersible pump, a flow altering device or sealing element of a flow control valve or differential pressure flowmeter, or a sealing element of a packer, and
  wherein the first location and the second location are on opposing sides of the monitored component such that neutrons from the neutron source must pass through the monitored component to be detected at the neutron detector.

10. The method of claim 9, wherein the control unit and the neutron detector form an integral unit.

11. The method of claim 9, wherein the control unit is located on the surface.

12. The method of claim 9, wherein the doping comprises at least one of (i) coating a surface of the monitored component with a coating having the pre-selected neutron absorbent or (ii) manufacturing the pre-selected neutron absorbent within a material of the monitored component.

13. The method of claim 9, wherein the pre-selected neutron absorbent is at least one of Boron, Gadolinium, and Americium- Beryllium.

14. The method of claim 9, wherein the neutron monitoring system includes a chemical neutron source.

15. The method of claim 9, wherein the neutron monitoring system includes a pulsed neutron generator and a neutron gamma detector.

16. The method of claim 9, further comprising comparing a neutron count against at least one of a predetermined threshold, a known spectra, and a known curve.

* * * * *